United States Patent [19]

Kiyohara et al.

[11] Patent Number: 4,819,012

[45] Date of Patent: Apr. 4, 1989

[54] INK-JET PRINTER WITH CAP MEANS

[75] Inventors: Takehiko Kiyohara, Zama; Koji Terasawa, Mitaka, both of Japan

[73] Assignee: Canon Kabushiki Kaisha, Tokyo, Japan

[21] Appl. No.: 617,928

[22] Filed: Jun. 6, 1984

[30] Foreign Application Priority Data

| | | | |
|---|---|---|---|
| Jun. 10, 1983 | [JP] | Japan | 58-102780 |
| Jun. 10, 1983 | [JP] | Japan | 58-102781 |
| Jun. 10, 1983 | [JP] | Japan | 58-102782 |
| Jun. 10, 1983 | [JP] | Japan | 58-102783 |

[51] Int. Cl.⁴ .......... G01D 15/18
[52] U.S. Cl. .......... 346/140 R
[58] Field of Search .......... 346/140 R

[56] References Cited

U.S. PATENT DOCUMENTS

| | | | |
|---|---|---|---|
| 4,223,322 | 9/1980 | van Raamsdonk | 346/140 |
| 4,228,442 | 10/1980 | Krull | 346/140 |
| 4,371,881 | 2/1983 | Bork | 346/140 |
| 4,383,263 | 5/1983 | Ozawa et al. | 346/140 |
| 4,401,990 | 8/1983 | Aiba | 346/75 |
| 4,410,900 | 10/1983 | Terasawa | 346/140 |
| 4,432,004 | 2/1984 | Glattli | 346/140 |
| 4,432,005 | 2/1984 | Duffield | 346/140 |
| 4,437,105 | 3/1984 | Mrazek et al. | 346/140 R |
| 4,533,927 | 8/1985 | Iwagami | 346/140 |
| 4,543,589 | 9/1985 | Terasawa | 346/140 |

*Primary Examiner*—Joseph W. Hartary
*Attorney, Agent, or Firm*—Fitzpatrick, Cella, Harper & Scinto

[57] ABSTRACT

An ink-jet printer has a printing means for discharging ink from a discharge port so as to print on a recording medium, a cap means for closing the discharge port of the printing means, an absorbing means, inside the cap means, for absorbing ink leaked in the vicinity of the discharge port of the printing means, and a removing means for removing the ink absorbed by the absorbing means.

24 Claims, 8 Drawing Sheets

INK-JET PRINTER WITH CAP MEANS

BACKGROUND OF THE INVENTION

1. Technical Field

The present invention relates to an ink-jet printer which records on a recording paper sheet by high-speed discharge of ink droplets from an ink-jet nozzle onto the paper sheet.

2. Description of the Prior Art

Of various recording systems, ink-jet printing very useful for a printer a copying machine or a word processor. Ink-jet printing system is a nonimpact recording which generates substantially no noise during recording and which is capable of high-speed recording. An ink-jet printing system does not require any special processing for fixing on a regular printing paper sheet.

Various improvements have been proposed and have been put into practice in ink-jet printing systems, and further developments are still being made.

In an ink-jet printing system, small ink droplets are discharged in accordance with various principles and are attached onto a recording medium for recording. An ink-jet printer generally comprises an ink-jet head for forming ink droplets, ink supply means for supplying ink to the ink-jet head, recovery processing means for recovering and processing the ink which is exhausted from the head in the recording mode, and clogging remedy processing means for eliminating clogging of an ink-jet nozzle or an ink channel of the head.

Although the ink-jet printing system is an excellent recording system with a simple configuration, it is also subject to some problems.

The first problem is clogging of the ink-jet nozzle. Two factors can be considered responsible for clogging of the ink-jet nozzle. The first factor is evaporation of an ink solvent from the end of the ink-jet nozzle and a resultant increase in the ink viscosity at the distal end of the nozzle. Thus, the ink cannot be properly discharged.

The second factor is introduction of fine dust or the like into the ink. The introduced dust clogs the ink-jet nozzle.

Another problem is associated with introduction of air bubbles into the ink. When such air bubbles in the ink are supplied into the ink-jet nozzle, the discharge energy is absorbed by the bubbles and the ink cannot be discharged. Alternatively the ink droplets are dispersed, causing so-called splashing.

In order to solve these problems, generally a clogging remedy processing means, including a pump means, is used. The pump means can be included at two different positions in the ink flow circuit. First, the pump means may be located between the ink-jet head and the ink tank. The pump compresses the ink in the ink tank and forces it toward the head. Highly viscous ink, and dust and air bubbles in the ink in the nozzle and channel are exhausted from the distal end of the nozzle as waste ink.

Second, the pump means may be connected to the distal end of the ink-jet nozzle. The ink is drawn by suction from the distal end of the nozzle so as to draw out as waste ink the highly-viscous ink, and fine dust and air bubbles in the ink in the head or channel for supplying ink to the head.

When the remedy operation is performed by the remedy processing means, the nozzle surface is covered with the waste ink which has leaked out from the nozzle.

In the case of a head nozzle wherein an array of a plurality of nozzles is formed on the nozzle surface, if the ink exhausted from an upper nozzle covers the lower nozzle, the lower nozzle may fail to discharge ink during subsequent recording. When ink is not removed from a covered nozzle for a long period of time, the ink solvent evaporates. Then, the remaining dye or the like forms a thin film on the nozzle end, and the nozzle covered with such a thin film of the ink cannot discharge ink during recording.

SUMMARY OF THE INVENTION

It is an object of the present invention to provide a highly reliable ink-jet printer which is capable of processing ink in the vicinity of the discharge port of a recording head.

It is another object of the present invention to allow satisfactory absorption of ink in the vicinity of the discharge port of a recording sheet.

It is still another object of the present invention to prevent a high flow resistance to waste ink.

It is still another object of the present invention to prevent attachment of dust or the like to a cap means during recording or the like.

The above and other objects and features of the present invention will become apparent from the following description taken in conjunction with the accompanying drawings.

BRIEF DESCRIPTION OF THE DRAWINGS

FIGS. 1 to 6 are views showing an ink-jet printer according to an embodiment of the present invention, in which:

FIG. 1 is a schematic sectional view of an ink supply system,

FIG. 2 is a perspective view showing a main part of the printer,

FIG. 3 is a cross-sectional view of a cap device,

FIG. 4 is a side sectional view of the cap device,

FIG. 5 is a perspective view of an ink absorber, and

FIG. 6 is a perspective view of an ink squeezing mechanism;

FIGS. 7 to 10 are views showing an ink-jet printer according to another embodiment of the present invention, in which:

FIG. 7 is a cross-sectional view thereof,

FIG. 8 is a side sectional view thereof,

FIG. 9 is a perspective view of an ink absorber, and

FIG. 10 is a perspective view showing another structure of an ink absorber; and FIGS. 11 to 15 are views showing an ink-jet printer according to still another embodiment of the present invention, in which:

FIG. 11 is a side sectional view thereof,

FIG. 12 is another side sectional view for explaining the mode of operation thereof, FIG. 13 is a perspective view of an ink absorber, FIG. 14 is a cross-sectional view of a cap device, and FIG. 15 is a front view of the same.

DETAILED DESCRIPTION OF THE PREFERRED EMBODIMENTS FIRST EMBODIMENT

Figure 1:
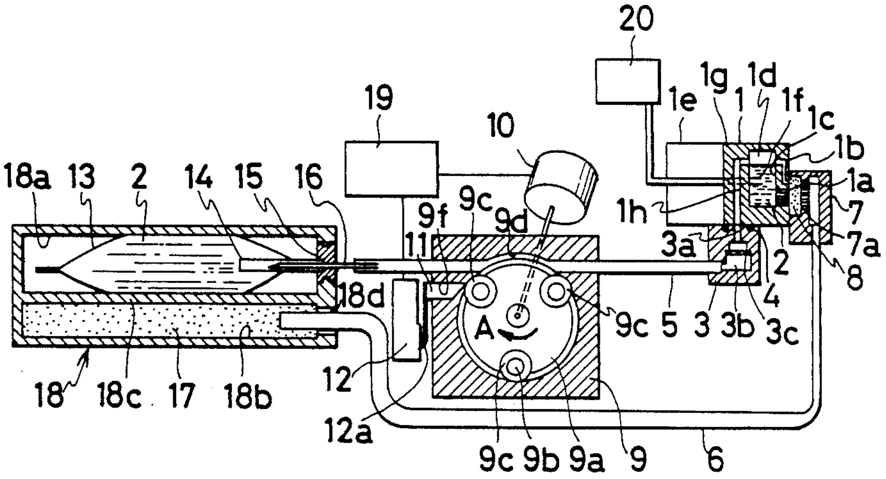

FIGS. 1 to 6 show the first embodiment of the present invention, and FIG. 1 schematically shows an ink supply system of this embodiment.

Referring to FIG. 1, the ink supply system comprises a recording head 1, a pump 9 and an ink cartridge 18.

Each of these parts has details to be described below.

The recording head 1 consists of a base 1*e* and a cover 1*g*.

The cover 1*g* is a flat casing having one open side. A plurality of grooves as ink-jet nozzles 1*a* are formed along this open side of the cover 1*g*. A groove as an air nozzle 1*b* is also formed at this side of the cover 1*g*.

The ink-jet nozzles 1*a* and the air nozzle 1*b* communicate with an ink chamber 1*c* at the center of the cover 1*g*.

An ink channel 1*h* is formed at the other side of the ink chamber 1*c*. The upper end of the ink channel 1*h* communicates with the ink chamber 1*c* through a channel, while the lower end of the ink channel 1*h* communicates with a pump to be described later through a small aperture.

A plurality of heating elements (not shown) are arranged at the side of the base 1*e* in one-to-one correspondence with the ink-jet nozzles 1*a*. Ink level detection electrodes 1*f* are arranged to vertically oppose each other at a predetermined distance therebetween.

The heating elements and the detection electrodes 1*f* described above can be quite easily formed by a thin film forming method such as deposition or sputtering of suitable materials on the base 1*e*.

The base 1*e* having the above construction and the cover 1*g* are formed integrally with each other such that the ink-jet nozzles 1*a* and the heating elements overlap each other.

Then, the open side of the cover 1*g* is closed by the base 1*e*, and the ink-jet nozzles 1*a* constitute discharge ports for discharging ink.

Note that the ink level detection electrodes 1*f* which are prepared separately from the base 1*e* can be incorporated by adhesion or the like.

When a predetermined pulse voltage as an application signal is applied to the recording head 1 having the above structure, a predetermined heating element is energized to generate heat. The ink supplied to the corresponding ink-jet nozzle 1*a* is instantaneously expanded and is discharged from the tip of the nozzle 1*a* toward the recording paper sheet.

The heating elements are used for the following purpose in addition to discharge of the ink.

In ink used for an ink-jet printer, a solvent having a large molecular weight is used so as to minimize the vapor pressure of the ink. For this reason, when the temperature becomes 10° C. or lower, the viscosity of the ink generally increases.

When the viscosity of the ink increases, ink discharge is interfered with. For this reason, it has been proposed to heat the portion surrounding the recording head or the vicinity of the printer when the ambient temperature is low.

However, when such a large area of a large thermal capacity such as the surrounding part of the recording head or the interior of the printer is to be heated to a predetermined temperature, it takes a long period of time and a large expenditure of energy.

In view of this, according to the present invention, a current is made to flow to the heating elements to heat them to a temperature at which the ink is not discharged. Then, the portion including the ink-jet nozzles 1*a* and the ink chamber 1*c* can be heated to a suitable temperature within a short period of time with a small expenditure of energy.

The ink channel 1*h* is connected to a head support 3 through an O-ring 4 which shields the channel 1*h* from external air.

The head support 3 has a liquid channel 3*a* communicating with the ink channel 1*h*, and a liquid channel 3*b* coupled to the liquid channel 3*a*. A filter 3*c* defines these channels 3*a* and 3*b*.

The filter 3*c* serves to filter out fine dust or the like in ink 2 and comprises a bundle of hollow glass fibers having a diameter or 20 to 30 $\mu$m. In addition to the removal of dust from the ink, the filter 3*c* has another purpose in increasing the liquid pressure in the liquid channel behind the ink-jet nozzles 1*a* when ink is discharged therefrom.

A cap 7 is arranged to oppose the recording head 1. The cap 7 is movable between a position at which covers the nozzles 1*a* and a position at which it is separated from the nozzles 1*a*.

The cap 7 has an absorber 8 and a number of small apertures 7*a*. The absorber 8 comprises a porous elastic body for absorbing ink discharged or leaked from the ink-jet nozzles 1*a* and the air nozzle 1*b*. The small apertures 7*a* are formed at the portion of the cap 7 behind the absorber 8 and serve to exhaust the ink absorbed by the absorber 8.

The cap 7 absorbs the ink from the nozzles 1*a* by means of the absorber 8 in accordance with capillary action. Thus, the cap 7 serves as a cap means as well as an absorbing means for the recording head.

The pump 9 as an ink supply means has the following construction.

A rotor 9*a* is mounted inside a circular space inside a casing of the pump 9 so as to be rotatable by a motor 10. A plurality of rollers 9*c* are rotatably supported through shafts 9*b* at equal angular intervals along the circumferential direction of the rotor 9*a*.

Although there is a difference between the diameter of the circular space in the pump 9 and the diameter of the rotor 9*a*, the rollers 9*c* are capable of rotating along the inner circumferential surface of the pump 9 defining the circular space therein.

An intermediate portion of a tube 5 extends between an arcuated wall 9*d* defining the upper portion of the circular space of the pump 9 and the rotor 9*a*.

One end of the tube 5 communicates with the liquid channel 3*a* at the side of the head support 3. A hollow needle 16 is mounted at the other end of the tube 5 and is inserted into a rubber stop of an ink cartridge to be described later.

One end of another tube 6 is connected to the side of the cap 7 and the other end of the tube 6 is connected to the ink cartridge.

A through hole 9*f* is formed at one side of the pump 9. A pin 11 is slidably received in the through hole 9*f*.

The inner end of the pin 11 is directed toward the arcuated wall of the space, while the outer end thereof extends outside the pump 9 and is in contact with a lever 12*a* of a microswitch 12.

When the rotor 9*a* rotates and one roller 9*c* contacts the pin 11, the pin 11 is slid in the direction away from the space inside the pump 9 and projects further from the pump 9. Then, the lever 12*a* is depressed, and the microswitch 12 is turned on.

In this manner, the microswitch 12 can detect the rotating position of the roller 9*c*. When signals generated upon detecting the respective rollers 9*c* are counted, the rotational frequency of the rotor 9*a* can be determined.

The microswitch 12 and the motor 10 are connected to a motor driver 19.

An ink cartridge 18 is divided into upper and lower spaces 18*a* and 18*b* by a partition wall 18*c*. An ink bag 13 holding the ink 2 therein is housed inside the upper space 18*a*.

The ink bag 13 is formed by laminating a high-polymeric film such as a nylon or polyethylene film on an aluminum foil film. One end of the ink bag 13 is closed, while the other end thereof is provided with a pipe 14 and a rubber stop 15. The hollow needle 16 extending from the tube 5 is inserted into this rubber stop 15. Thus, the ink 2 inside the ink bag 13 can be supplied to the recording head 1 through the tube 5.

An ink absorber 17 is housed in the lower space 18*b* of the ink cartridge 18 so as to absorb waste ink absorbed through the tube 6.

Figure 2:
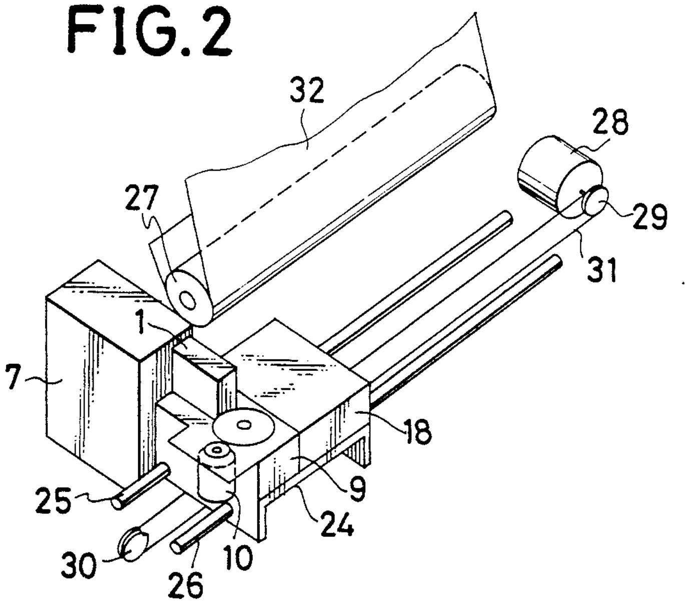

FIG. 2 is a schematic perspective view of the printer mechanism having the ink supply system as described above. The same reference numerals as in FIG. 1 denote the same parts in FIG. 2.

Referring to FIG. 2, a carriage 24 is slidably fitted around guide rails 25 and 26. The carriage 24 is connected to a portion of an endless wire 31 which is wound around a pulley 29 fixed at the distal end of the output shaft of a motor 28 for driving the carriage 24 and a driven pulley 30. Thus, the cartridge 24 can freely move along the guide rails 25 and 26.

The ink supply system, the recording head and the like described above are mounted on the carriage.

A recording paper sheet 32 is wound around a platen 27. When the platen 27 is rotated, the recording paper sheet 32 is fed along the line feed direction.

The mode of operation of the ink-jet printer having the above construction will now be described.

The ink supply operation will first be described.

A control unit (not shown) monitors through a level detection circuit 20 the ink level in the ink chamber 1*c* of the recording head 1 every time printing of one page is completed.

When it is detected through the level detection circuit 20 that the ink level inside the ink chamber 1*c* is below a predetermined level, the control unit drives the motor driver 19 to drive the motor 10 and to energize the pump 9.

When the ink level inside the ink chamber 1*c* reaches the predetermined level, the pump 9 is stopped after being rotated a predetermined number of times.

The pump 9 is rotated for the predetermined number of times after the ink level inside the ink chamber 1*c* is detected to have reached the predetermined level for the following reason. That is, the pump 9 is rotated to supply an extra amount of ink corresponding to the remaining volume of the ink chamber 1*c* above the electrodes 1*f* and the ink portion ejected through the nozzles 1*a*.

In response to a roller position signal generated from the microswitch 12 upon contact between the pin 11 and a roller 9*c* of the pump 9, the control unit stops the rotor 9*a* at a position at which the roller 9*c* presses the pin 11 and is not contact with the tube 5, as shown in FIG. 1.

In this state, the tube 5 is not completely decompressed by the roller 9*c*, and the liquid channel of the tube 5 is open.

During printing by the recording head 1, ink is supplied from the ink bag 13 to the ink chamber 1*c* through the tube 5 by capillary action due to the surface tension of the ink 2 and the negative pressure inside the ink chamber 1*c* due to ink discharge.

However, when the level detection circuit 20 determines that the ink level is above the predetermined level, the above operation is not performed.

Detection and remedy of insufficient ink will be performed in the following manner.

When the ink level does not reach the electrodes 1*f* after performing the above ink supply operation exceeding a predetermined period of time and the level detection circuit 20 fails to detect the predetermined ink level, the control unit determines that there is no ink inside the ink bag 13.

Then, the control unit signals to the operator that the supply of ink is insufficient by turning on an LED (not shown) or generating an alarm sound, and also stops the printing operation.

Replacement of the ink cartridge 18 can be performed in the following manner.

The old ink cartridge 18 is pulled out, and a new ink cartridge 18 is inserted. Thereafter the operator depresses a mount switch (not shown). Then, the motor 10 is rotated, the pump 9 is energized, and the ink 2 inside the ink bag 13 is supplied to the ink chamber 1*c* through the tube 5 and the like. When the predetermined period of time required for the ink to reach the inlet port of the air nozzle 1*b* has passed, the pump 9 is stopped at a predetermined position.

The ink which has leaked from the air nozzle 1*b* and the ink-jet nozzles 1*a* during this operation is absorbed by the absorber 8. The absorbed ink is exhausted into the absorber 17 of the cartridge 18 through the pipe 6.

The first remedy operation when printing after a long OFF period of time is performed as follows.

When the printer has not been used for a long time after the power was turned off or when the printer has not been used for printing even if power is supplied thereto, printing cannot be performed at all or printing at only a light density occurs in the initial period. Alternatively, ink splashing and contamination of the recording paper sheet occurs.

These problems occur since the ink at the distal end of the ink-jet nozzles 1*a* has a high viscosity due to evaporation of the ink solvent.

In such a case, when a printing command is supplied, the control unit first detects that printing has not been performed for a long period of time and then detects the ink level through the level detection circuit 20. When it is determined that the ink level is below the predetermined level, the ink supply operation as described above is performed.

On the other hand, when it is determined that the ink level is above the predetermined level, the control unit stops the pump 9 after driving it a predetermined number of times. This is performed for the same reason as described with reference to the ink supply operation. That is, when the pump 9 is rotated for the predetermined number of times, the extra amount of ink corresponding to the remaining volume of the ink chamber 1*c* above the electrodes 1*f* and to the ink portion discharged through the nozzles 1*a* is replenished.

The operation of the cap 7 and the absorbing operation of the waste ink thereby will be described below.

When a motor (not shown) is driven while the recording head 1 is at a position other than the printing position, that is, the home position, the cap 7 is rotated around a shaft and covers and seals all of the ink-jet nozzles 1*a*. In this state, evaporation of the solvent in the ink from the inkjet nozzles 1*a* and attachment of the dust or the like onto the nozzle surfaces can be prevented.

When the cap 7 is fitted over the ink-jet nozzles 1*a*, the ink leaked from the ink-jet nozzles 1*a* is absorbed by the capillary action of the absorber 8. When the pump 9 is energized, the ink inside the cap 7 is exhausted into and absorbed by the absorber 17 inside the lower space 18*b* for forcibly recovering the waste ink introduced into the ink cartridge through the tube 6.

The details of the operation of the cap 7 are as follows.

When the pump 9 is energized as described above, the cap 7 is fitted over the ink-jet nozzles 1*a* and, when ink recovery is completed, the pump 9 is deenergized and the cap 7 is separated from the ink-jet nozzles 1*a*.

When printing of one page is completed, the recording head 1 is returned to the home position. When the recording head 1 is returned to the home position, the cap 7 is fitted over the distal ends of the ink-jet nozzles 1*a*. Immediately before printing the next page is begun, the cap 7 is separated from the nozzles 1*a* and normal printing is thereafter performed.

When the pump 9 is energized during the ink replenishment operation as described above, if the ink cartridge 18 is not mounted, the waste ink is scattered inside the printer. In view of this, the pump 9 is energized only if a signal representing that the ink cartridge 18 is mounted is received. This signal is generated by a microswitch or the like (not shown) which is arranged at the mount position of the cartridge 18.

Further details of the cap 7 used in the present invention will be described with reference to FIGS. 3 to 6.

A screw shaft 36 is axially supported through bearing members 34 and 35 mounted on a base 33. Rotation of a motor 39 is transmitted to the screw shaft 36 through gears 37 and 38. The screw shaft 36 meshes with legs 40*a* and 40*b* of a casing 40 as a casing of the cap 7. Therefore, when the motor 39 is rotated, the casing 40 is moved toward or away from the head 1 so that the cap 7 is also moved toward or away from the head 1.

An elastic body 41 consisting of rubber or the like is arranged to surround the aperture of the casing 40 corresponding to the head 1. When the casing 40 opposes the head 1, the elastic body 41 serves to provide a seal between the casing 40 and the head 1.

Figure 4:
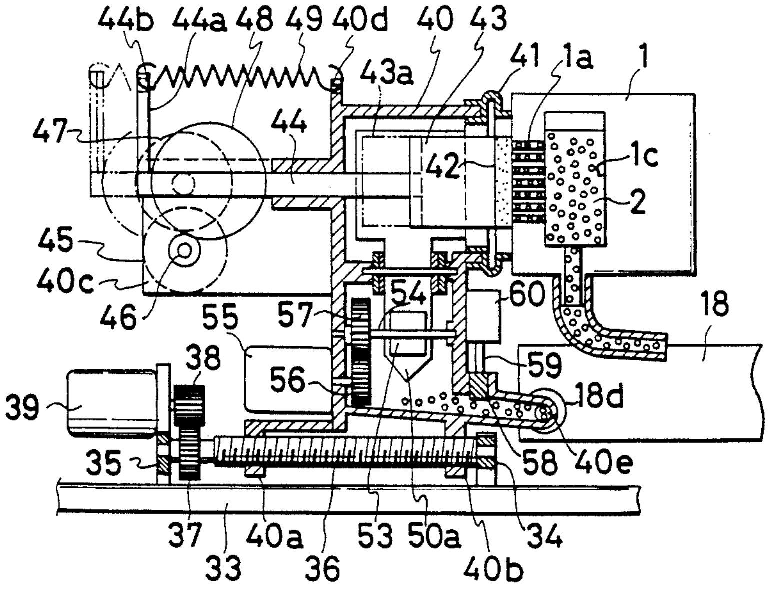
Figure 5:
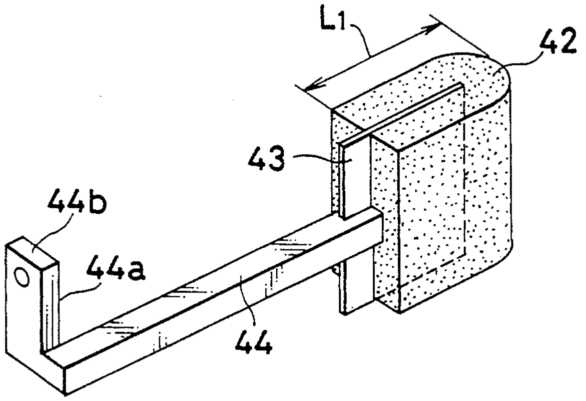

Referring to FIGS. 4 and 5, an ink absorber 42 comprises, for example, a mass of a synthetic resin or a sponge-like body of a synthetic resin. The absorber 42 is fixed to a moving shaft 44 through a plate member 43.

Referring to FIG. 4, a motor 45 is mounted at a motor mount portion 40*c* of the casing 40. The motor 45 serves as a drive source for moving the ink absorber 42 toward or away from the nozzles 1*a*. The rotation of the motor 45 is transmitted to a disk cam 48 through gears 46 and 47 arranged on the motor shaft. The center of the disk cam 48 is deviated from that of the gear 46 and is formed integrally with the gear 47. The gears 46 and 47 and the cam 48 are supported on the casing 40 by a central shaft of the gear 47.

The disk cam 48 engages with a rear end upright portion 44*a* of the moving shaft 44.

A spring 49 is mounted between an upper end 44*b* of the upright portion 44*a* and an end 40*d* of the casing 40. Therefore, a biasing force acting toward the head 1 is always acting on the absorber 42 through the moving shaft 44.

Figure 6:
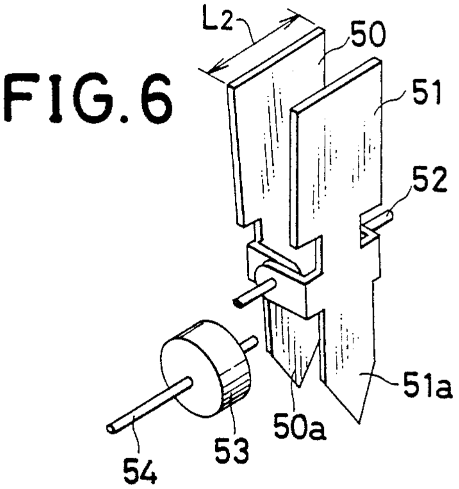

Referring to FIG. 6, squeezing plates 50 and 51 remove the ink absorbed by the absorber 42. A shaft 52 rotatably supports the squeezing plates 50 and 51. An elliptical squeezing plate drive cam 53 is fixed to a shaft 54 and is inserted between lower ends 50*a* and 51*a*, respectively, of the squeezing plates 50 and 51.

The rotation of the motor 55 is transmitted to the shaft 54 through gears 56 and 57. The distal end of an L-shaped tube portion 40*e* is at the lowermost portion of the casing 40 and projects parallel to the moving direction of the carriage 24. When the carriage 24 is located at the home position, the distal end of the tube portion 40*e* is dipped inside an inlet port 18*d* of a storage section for storing waste ink of the ink cartridge 18.

When the tube portion 40*e* and the inlet port 18*d* communicate in this manner, the casing 40 of the cap 7 and the waste ink storage are coupled. Therefore, the tube portion 40*e* and the inlet port 18*d* constitute a communicating means.

A valve 58 serves to block flow out of the ink collected at the bottom of the casing 40. The valve 58 is opened/closed by a solenoid 59 driven by an electromagnet 60.

The screw shaft 36 extending between the bearing members 34 and 35 extends through bearings arranged in the legs 40*a* and 40*b* of the casing 40, and allows linear movement of the casing 40 relative to the head 1.

The operation of the cap 7 described above will now be described for each item.

(1) Capping Operation

Figure 3:
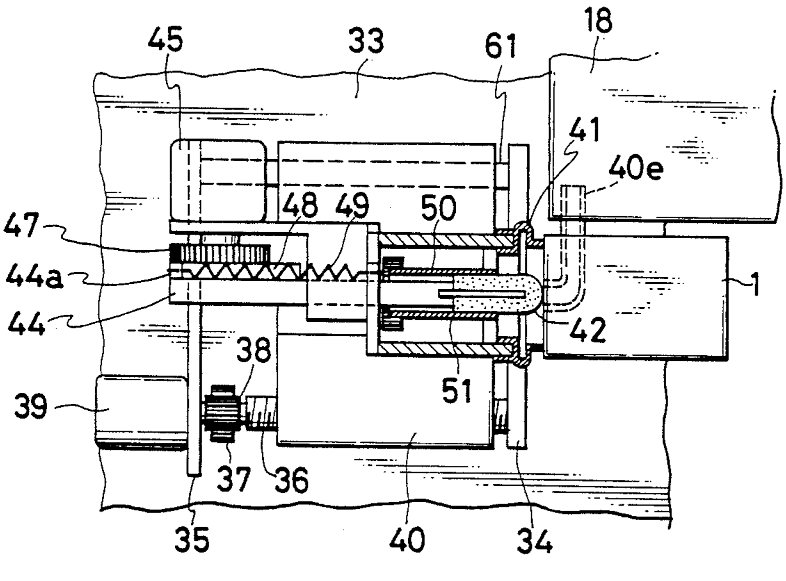

Referring to FIG. 2, when the carriage 24 stops at a predetermined position corresponding to the home position, the motor 39 shown in FIGS. 3 and 4 is rotated, and subsequently the screw shaft 36 is driven by the gears 38 and 37.

The screw shaft 36 and the casing 40 threadably engage with each other. When the screw shaft 36 is rotated, the casing 40 is drawn closer to the head 1 and contacts a portion surrounding the nozzles 1*a* through the elastic body 41. Then, the movement of the casing 40 is stopped.

In this state, the nozzles 1*a* are shielded from contact with external air by means of the elastic body 41. Therefore, evaporation of the ink solvent at the distal ends of the nozzles 1*a* is prevented.

(2) Leaked Ink Absorption Operation

When rotation of the motor 45 is transmitted through the gears 46 and 47, the disk cam 48 is rotated. The upright portion 44*a* of the moving shaft 44 driven by the disk cam 48 is moved by the spring 49 from the position indicated by the alternate two short and one long dashed lines in FIG. 4 to the position indicated by the solid line. When the shaft 44 is moved, the entire surface of the absorber 42 is brought into contact with the discharge ports of the nozzles 1*a* of the head 1. When the pump 9 shown in FIG. 1 is operated and ink 2 leaks from the distal ends of the nozzles 1*a* in this state, the absorber 42 absorbs the leaked ink and does not allow the leaked ink to remain at the discharge ports of the nozzles 1*a*.

(3) Ink Squeezing from Absorber 42

When the absorbing capacity of the absorber 42 is saturated or a predetermined number of absorption operations has been completed, the motor 45 is rotated in the reverse direction to return the moving shaft 44 from the position indicated by the solid line to the position indicated by the alternate two short and one long dashed line. Therefore, the absorber 42 interlinked with the moving shaft 44 is separated from the head 1.

The absorber 42 which has been separated from the head 1 is stopped at an intermediate position between the squeezing plates 50 and 51.

The rotation of the motor 55 is transmitted to the shaft 54 through the gears 56 and 57. When the squeezing plate drive cam 53 is brought from the vertical state to the horizontal state upon rotation of the shaft 54, the upper portions of the squeezing plates 50 and 51 draw closer to each other. Then, the ink in the absorber 42 between the squeezing plates 50 and 51 is squeezed out and flows downward along the lower ends 50*a* and 51*a* to collect at the bottom of the casing 40.

The absorber 42 from which the ink has been squeezed out by the squeezing plates 50 and 51 recovers the capacity for absorbing ink leaking from the nozzles 1*a*.

(4) Exhaust of Absorbed Ink into Ink Cartridge

When the valve 58 is opened while the tube portion 40*e* of the casing 40 is inserted in the inlet port 18*d* of the ink cartridge 18, the ink which has collected at the bottom of the casing 40 flows into the absorber 17 of the ink cartridge 18 from the distal end of the tube portion 40*e*.

When the valve 58 is closed after a predetermined period of time, the ink stops flowing out into the absorber 17. Furthermore, when the valve 58 is closed, the interior of the casing 40 is shielded from external air. Therefore, the vapor pressure inside the casing 40 is the same as that of the ink, and evaporation of the ink solvent from the nozzles 1*a* can be prevented.

If the waste ink absorbed by the absorber 17 of the ink cartridge 18 is exhausted into the ink cartridge when there is no more ink in the ink bag 13, a tank for holding the waste ink need not be specially included, thus providing a convenient printer for the user.

(5) State of Cap in Non-Printing and Printer Off Modes

When the printer is in the non-printing mode, the absorber 42 is separated from the nozzles 1*a* of the head 1. Meanwhile, the elastic body 41 is in tight contact with the portion surrounding the nozzles 1*a*. Therefore the nozzles 1*a* are shielded from external air. Evaporation of the ink solvent from the discharge ports of the nozzles 1*a* is thus prevented.

In the ink squeezing mechanism of the absorber 42 of this embodiment, a width L1 of the absorber as shown in FIG. 5 can be rendered to equal a width L2 of the squeezing plate 50 or 51 shown in FIG. 6. Therefore, the absorber 42 can be pressed within a wide area, and a good squeezing effect is obtained. The squeezing plates 50 and 51 have an elastic property Therefore, when the drive cam 53 is rotated and when there is no margin for squeezing the absorber 42, the squeezing plates 50 and 51 can deflect due to their elasticity. Thus, rotation of the drive cam 53 is not prevented.

SECOND EMBODIMENT

The second embodiment of the cap will be described with reference to FIGS. 7 to 10.

The same reference numerals as those in FIGS. 1 to 6 denote the parts of similar functions and shapes in FIGS. 7 to 10, and the functions and operations of these parts will not be described.

Figure 7:
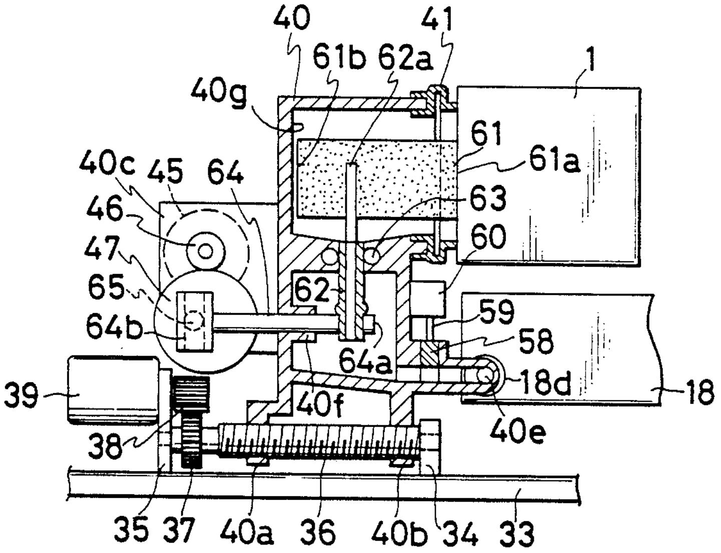
Figure 9:
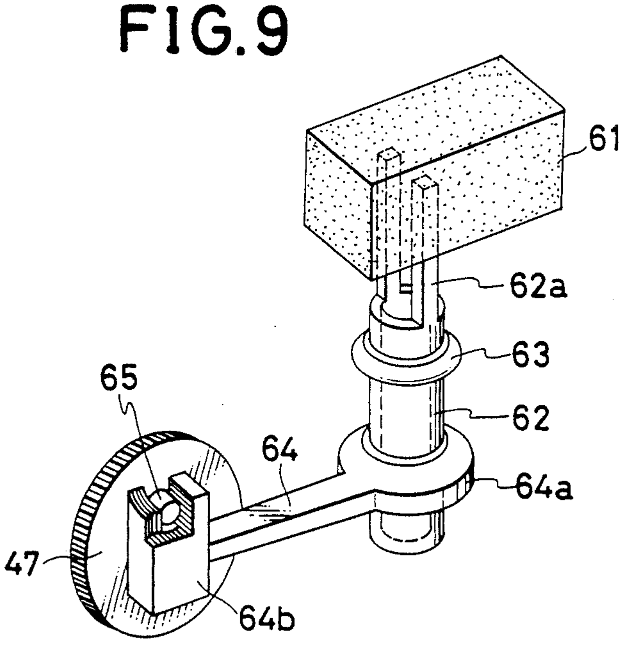

Referring to FIGS. 7 and 9, a hollow tube 62 supports an ink absorber 61. A distal end 62*a* of the tube 62 is inserted into the absorber 61 to couple the former to the latter. An O-ring 63 is interposed between the outer surface of the tube 62 and the wall of a casing 40. The O-ring 63 provides a seal between the outer surface of the tube 62 and the wall of the casing 40. The O-ring 63 also serves as a bearing when the tube 62 is pivoted.

A piston shaft 64 is slidably arranged at a bearing 40*f* at one side of the casing 40.

A distal end 64*a* of the piston shaft 64 has an annular shape, and the tube 62 is inserted inside this annular distal end 64*a*.

A guide member 64*b* having a slide guide groove is arranged at the other end of the piston shaft 64.

A slide pin 65 extending from a gear 47 engages with the groove formed in the guide groove 64*b*.

A drive mechanism consisting of the gears 46 and 47, the slide pin 65, the piston shaft 64, the tube 62 and so on is energized by a motor 45 as a common drive source. The drive mechanism moves the absorber 61 toward and away from a recording head 1 and also squeezes the absorber 61.

The operation for exhausting the ink absorbed into the absorber 61 will now be described with reference to FIGS. 7 and 8.

Figure 8:
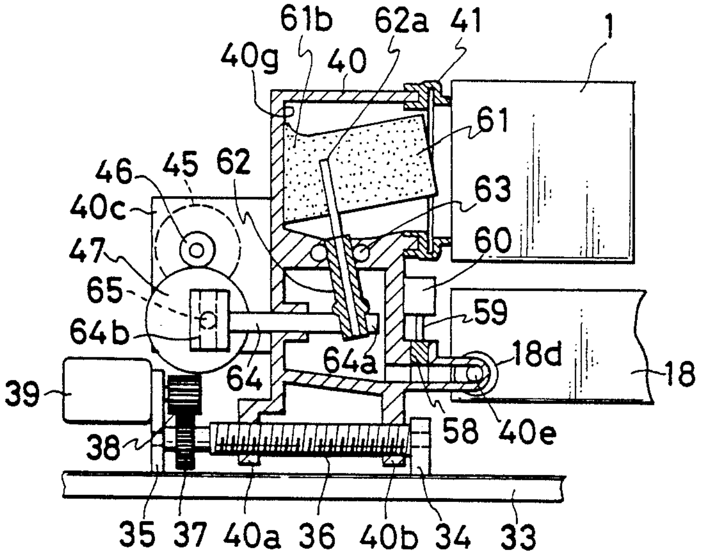

When the motor 45 is driven in the state shown in FIG. 7, the slide pin 65 is displaced to the position shown in FIG. 8 through the gears 46 and 47.

Upon movement of the slide pin 65, the guide member 64*b* is also moved to the right in FIG. 8. Therefore, the tube 62 is pivoted counterclockwise about the O-ring 63 through the distal end 64*a* of the piston shaft 64.

A rear end 61*b* of the absorber 61 abuts against a wall 40*g* of the casing 40. The rear end of the absorber is squeezed and the ink in the rear end 61*b* is squeezed out.

The ink squeezed from the absorber 61 is collected at the bottom of the casing 40 through the tube 62. The ink which has collected at the bottom is exhausted outside an ink cartridge 18 through an L-shaped tube portion 40*e* and the ink inlet port 18*d*. When the tube 62 pivots clockwise, a front surface 61*a* of the absorber 61 is simultaneously separated.

In the above embodiment, squeezing of the absorber and separation of the absorber 61 from the head 1 are performed by a single drive source. Therefore, the overall printer becomes simple in construction. Since the coupling between the hollow tube 62 and the absorber 61 is accomplished with a simple construction, replacement of the absorber 61 is easy to form.

Figure 10:
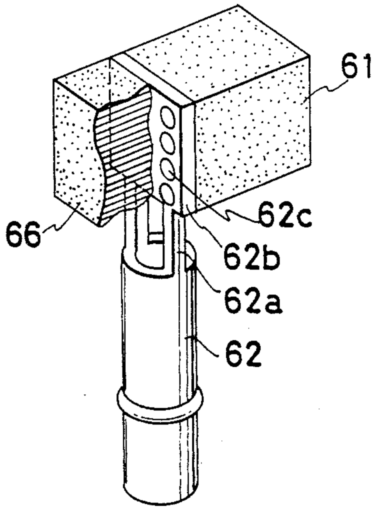

FIG. 10 is a view showing another construction of a tube 62 and an absorber 61. A plate 62*b* with small holes 62*c* is mounted at an end 62*a* of the tube 62. The absorber 61 is at the right side surface of the plate 62*b*, while another absorber 66 is arranged at the left side surface of the plate 62*b*.

Since the absorber 61 consists of a material which does not easily disintegrate, small pieces or fibers of the absorber 61 will not be introduced into ink-jet nozzles 1*a* of a recording head 1.

Meanwhile, the absorber 66 consists of a soft material. Therefore, the absorber 66 is easily pressed and allows easy squeezing-out of the waste ink.

THIRD EMBODIMENT

The third embodiment of the cap will be described with reference to FIGS. 11 to 15.

The same reference numerals as in FIGS. 1 to 10 denote parts of similar functions and shapes in FIGS. 11 to 15, and the functions and shapes of these parts will not be described.

Figure 11:
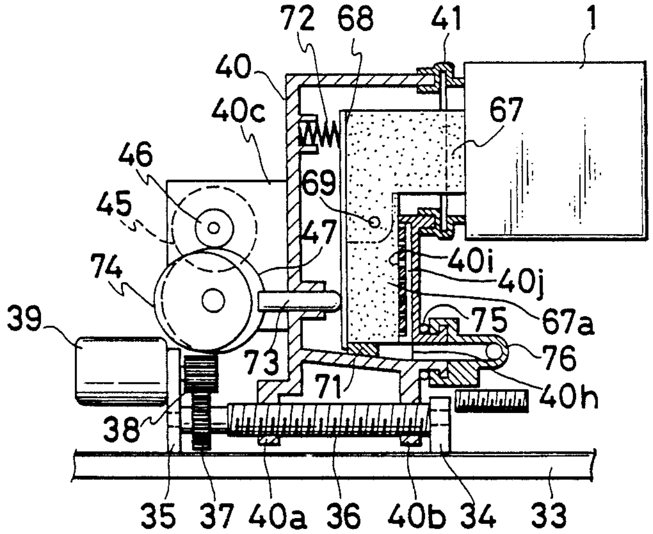
Figure 13:
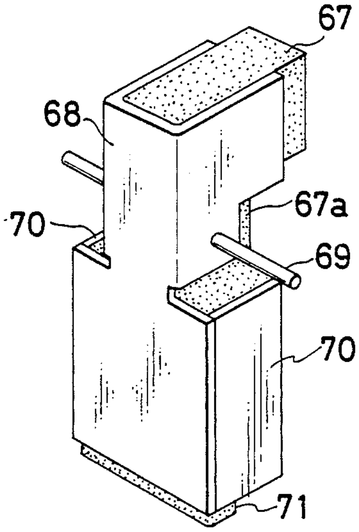

Referring to FIGS. 11 and 13, an absorber 67 is held by a frame 68.

A support shaft 69 supports the frame 68 when it swings. A rubber sheet 70 is used to reduce the friction between the side wall of a casing 40 and the absorber 67. A shoe member 71 lifts the bottom of the casing 40 to drain the ink and also serves as a valve covering an ink outlet port 40*h* of the casing.

A spring 72 biases the frame 68 clockwise.

A lift pin 73 transmits clockwise or counterclockwise rotation to the frame 68. A disk cam 74 drives the lift pin 73 in synchronism with a gear 47.

Referring to FIG. 11, the absorber 67 is abutted against a head 1 through the frame 68 by the biasing force of the spring 72. The ink leaked from nozzles 1*a* is absorbed by the absorber 67 in the above-mentioned state. When a motor 45 is rotated in this state, the disk cam 74 rotates to a position shown in FIG. 12 through gears 46 and 47. When the disk cam 74 pivots, the lift pin 73 moves to the right. Then, the frame 68 rotates counterclockwise about the shaft 69 against the biasing force of the spring 72. A lower portion 67*a* of the absorber 67 abuts against a perforate surface 40*i* formed in the inner wall of the casing 40. The lower portion 67*a* is thus squeezed, and the squeezed ink is exhausted into an ink cartridge 18 through a liquid channel 40*j*, the outlet port 40*h*, and an L-shaped pipe 76.

The ink collected at the bottom of the casing 40 is forcibly exhausted by the shoe member 71 from the outlet port 40*h* by the repeated swing movement of the frame 68.

In the non-recording mode, the absorber 67 is separated from the head 1. Since the shoe member 71 covers the outlet port 40*h*, the ink inside the casing 40 does not leak outside.

In this manner, the drive mechanism consisting of the gears 46 and 47, the disk cam 74 and the lift pin 73 is moved by the motor 45 as a common drive source so as to move the absorber 67 toward or away from the recording head 1, thereby squeezing the ink from the absorber 67.

The portions of the absorber, 67 which contact with the head 1 and the perforate surface 40*i* of the casing 40 can consist of different materials, as has been described with reference to FIG. 10.

Figure 14:
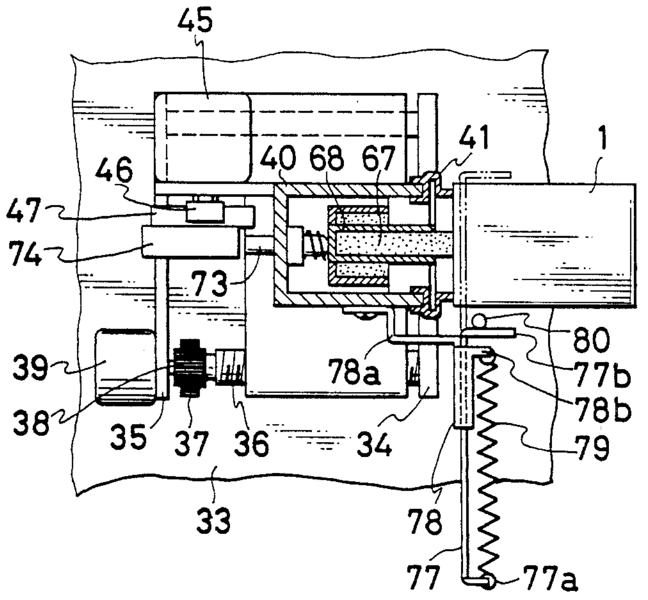

The shutter for closing the opening in the casing 40 corresponding to the head 1 and the L-shaped pipe 76 arranged below the casing 40 will be described with reference to FIGS. 14 and 15.

A shutter plate 77 covers an elastic body 41 arranged near the opening of the casing 40 when the carriage 24 is at the recording position and is withdrawn from the elastic body 41 when the carriage 24 is at the home position.

The shutter plate 77 is held by a guide member 78 to be movable in the right-to-left direction An end portion 78*a* of the guide member 78 is fixed to the outer surface of the casing 40.

A spring 79 is hooked between a bent end portion 78*b* of the guide member 78 and a bent end portion 77*a* of the shutter plate 77. Therefore, the shutter 77 is biased by the spring 79 to normally close the opening of the casing 40.

A pin 80 is arranged near the head 1 on the carriage 24. The shutter plate 77 has another bent end portion 77*b*.

Figure 15:
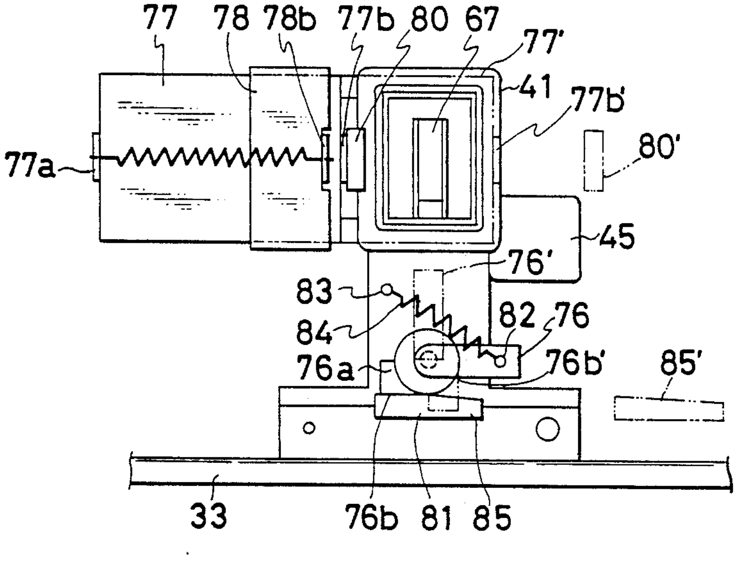

Referring to FIG. 15, when the carriage 24 is at the recording position, the pin 80 is at a position to the right of at least a position 80′ indicated by the alternate two short and one long dashed line. Therefore, the bent end portion 77*b* of the shutter plate 77 is at a position 77*b*′ and the shutter plate 77 is at a position 77′ also, indicated by the alternate two short and one long dashed line. The opening of the casing 40 is closed by the shutter plate 77, and dust is prevented from entering into the absorber 67. In this manner, it is ensured that the surface of the absorber 67 which contacts the head surface is free from dust.

When the carriage 24 draws closer to the home position, the pin 80 abuts against the bent end portion 77*b* of the shutter plate 77. While the carriage 24 goes to the home position, the pin 80 maintains the bent end portion 77*b* at the position indicated by the solid line shown in FIG. 15. Therefore, the shutter plate 77 is withdrawn from the position above the opening of the casing 40.

The rotating operation of the L-shaped pipe 76 will be described.

The distal end of the L-shaped pipe 76 as a duct for exhausting the ink in the casing 40 to the waste ink storage section of the ink cartridge 18 of the carriage 24 is parallel to the moving direction of the carriage 24. Therefore, while the carriage 24 draws closer to the home position, it is naturally inserted into the ink cartridge 18 through the inlet port 18*c* thereof.

Figure 12:
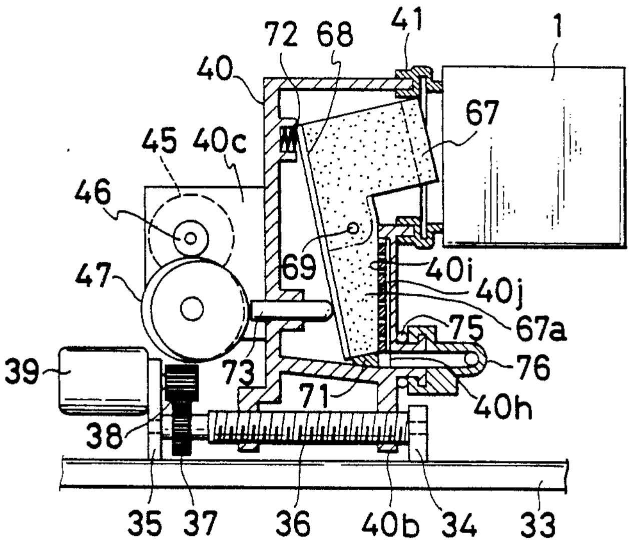

Referring to FIG. 12, the L-shaped pipe 76 is rotatably arranged at the exhaust port of the casing 40 through an O-ring 75.

A spring 84 is hooked between a pin 82 extending from the L-shaped pipe 76 and a pin 83 extending from the front of the casing 40. The spring 84 biases the L-shaped pipe 76 counterclockwise.

A cam projection 76*a* is arranged at the L-shaped pipe 76 and has a cam surface 76*b*. A cam drive member 85 is arranged at the lower portion of the carriage 24.

Referring to FIG. 15, when the carriage 24 is not at the home position, the cam drive member 85 is disengaged from the cam surface 76*b*. Therefore, the L-shaped pipe 76 is at a position 76′ indicated by the alternate two short and one long dashed line. In this state, the ink in the pipe 76 will not leak downward.

When the carriage 24 moves toward the home position, the cam drive member 85 is moved to the left from a position 85′ indicated by the alternate two short and one long dashed line. When the left end of the cam drive member 85 abuts against the cam surface 76*b* of the L-shaped pipe 76, the pipe 76 rotates to the position indicated by the solid line. In this state, the pipe 76 is moved closer to the inlet port 18*d* of the ink cartridge 18 and finally the distal end of the pipe 76 is inserted into the inlet port 18*d*.

As may be seen from the above description, according to the present invention, an ink absorber for absorbing ink leaked from nozzles is arranged inside a cap sealing the portion of the ink-jet head nozzles. A means is provided to change the volume of the ink absorber and thus squeeze out the ink absorbed in the absorber. For this reason, the absorber is constantly kept in a state capable of absorbing further ink, so that any leaked ink from the nozzles can be reliably absorbed and clogging of the nozzles with leaked ink can be prevented.

Furthermore, according to the present invention, an ink-jet printer is provided wherein an absorber is arranged for absorbing ink leaking from nozzles of an ink-jet head, and the absorber is separated from the nozzles in a cam means in a non-recording mode, so that the head can be kept sealed in the non-recording mode, and evaporation of ink and clogging of the nozzles can thus be prevented.

According to the present invention, a structure is adopted wherein a waste ink inlet port communicating with a waste ink storage section of an ink cartridge and an exhaust port for exhausting the ink from an ink absorbing means are engaged in the same direction as the moving direction of a carriage. Accordingly, waste ink can be absorbed with good efficiency without experiencing a great flow resistance.

Finally, according to the present invention, a shutter means opens/closes the opening of the cap means, the shutter means is opened/closed in synchronism with the reciprocal movement of the carriage, and the opening of the cap means is opened only during capping. Accordingly, dust is not attached to that surface of the ink absorbing member in the cap means which is brought into contact with the nozzles, and nozzle clogging can be reliably prevented.

What is claimed is:

1. An ink-jet printer comprising:

printing means having a discharge port for discharging ink for printing on a recording medium;

cap means for covering said discharge port, said cap means being movable into and out of sealing engagement with said printing means;

cap moving means for moving said cap means into and out of sealing engagement with said printing means;

absorbing means, arranged wholly inside said cap means and movable into and out of direct contact with said discharge port while said cap means covers said discharge port in sealing engagement with said printing means, for absorbing the ink in the immediate vicinity of said discharge port;

means for moving said absorbing means between a position at which said absorbing means is in direct contact with said discharge port and a position at which said absorbing is separated from said discharge port while said cap means is in sealing engagement with said printing means; and removing means for removing the ink absorbed by said absorbing means.

2. A printer according to claim 1, wherein said absorbing means comprises a porous elastic body.

3. A printer according to claim 1, further comprising supply means for supplying the ink to said printing means.

4. An ink-jet printer comprising:

printing means having a discharge port for discharging ink for printing on a recording medium;

cap means for covering said discharge port;

absorbing means comprising a porous elastic body, arranged wholly inside said cap means and movable into and out of direct contact with said discharge port when said cap means covers said discharge port, for absorbing the ink in the immediate vicinity of said discharge port; and removing means for removing the ink absorbed by said absorbing means by compressing said absorbing means.

5. An ink-jet printer comprising:

printing means having a discharge port for discharging ink for printing on a recording medium;

cap means for covering said discharge port;

absorbing means, arranged wholly inside said cap means and movable into and out of direct contact with said discharge port when said cap means covers said discharge port, for absorbing the ink in the immediate vicinity of said discharge port; and removing means for removing the ink absorbed by said absorbing means, wherein said removing means includes a common power source for generating power for moving said absorbing means away from said discharge port and for exhausting the ink from said absorbing means.

6. An ink-jet printer comprising:

printing means having a discharge port for discharging ink for printing on a recording medium;

cap means for covering said discharge port;

absorbing means, arranged wholly inside said cap means and movable into and out of direct contact with said discharge port when said cap means covers said discharge port, for absorbing the ink in the immediate vicinity of said discharge port; and removing means for removing the ink absorbed by said absorbing means, wherein said cap means has an opening for exhausting the ink absorbed by said absorbing means to the outside and a valve member for closing said opening when said cap means is separated from said printing means.

7. An ink jet printer comprising:

printing means having a discharge port for discharging ink for printing on a recording medium;

cap means for covering said discharge port, said cap means being movable into and out of sealing engagement with said printing means;

cap moving means for moving said cap means into and out of sealing engagement with said printing means;

absorbing means, arranged wholly inside said cap means, for absorbing the ink in the immediate vicinity of said discharge port; and means for moving said absorbing means between a position at which said absorbing means is in direct contact with said discharge port and a portion at which said absorbing means is separated from said discharge port while said cap means is in sealing engagement with said printing means.

8. A printer according to claim 7, further comprising removing means for removing the ink absorbed by said absorbing means.

9. An ink jet printer comprising:

printing means having a discharge port for discharging ink for printing on a recording medium;

cap means for covering said discharge port;

absorbing means, arranged wholly inside said cap means, for absorbing the ink in the immediate vicinity of said discharge port;

moving means for moving said absorbing means between a position at which said absorbing means is in direct contact with said discharge port and a position at which said absorbing means is separated from said discharge port when said cap means covers said discharge port;

removing means for removing the ink absorbed by said absorbing means, wherein said moving means and removing means are driven by a common drive source; and a drive mechanism for energizing said removing means when said moving means moves said cap means away from said printing means.

10. An ink jet printer comprising:

printing means having a discharge port for discharging ink for printing on a recording medium;

cap means for covering the discharge port;

absorbing means, arranged wholly inside said cap means, for absorbing the ink in the immediate vicinity of said discharge port; and moving means for moving said absorbing means between a position at which said absorbing means is in direct contact with said discharge port and a position at which said absorbing means is separated from said discharge port when said cap means covers said discharge port, wherein said cap means has an opening for exhausting the ink absorbed by said absorbing means, and said cap means has a valve member for closing said opening, said opening being closed by said valve member when said moving means moves said cap means away from said printing means.

11. An ink-jet printer comprising:

printing means for discharging ink from a discharge port for recording on a recording medium;

waste ink storage means for storing waste ink;

carriage means, having said printing means and said waste ink storage means thereon, mounted for movement along the recording medium;

absorbing means for absorbing the ink in the vicinity of the discharge port of said printing means when said carriage means is at a specific position; and coupling means for coupling said waste ink storage means and said absorbing means for exhausting the ink absorbed by said absorbing means when said carriage means is at the specific position.

12. A printer according to claim 11, wherein said coupling means comprises a pipe member extending from said absorbing means substantially parallel to a moving direction of said carriage means, and an inlet portion arranged for said waste ink storage means so as to be coupled to said pipe member.

13. A printer according to claim 11, wherein said absorbing means comprises cap means for covering the discharge port of said printing means at the specific position, and absorbing means, made of a porous elastic material, for absorbing the ink.

14. A printer according to claim 12, wherein said pipe member is held so as to be rotatable relative to said absorbing means, and is rotated upon movement of said carriage means parallel to the moving direction of said carriage means.

15. A printer according to claim 13, further comprising shutter means for opening/closing an opening of said cap means, said shutter means opening the opening of said cap means upon movement of said carriage means to the specific position and closing the opening of said cap means when said carriage means is at a position other than the specific position.

16. An ink-jet printer comprising:

printing means for discharging ink from a discharge port for printing on a recording medium;

cap means for covering the discharge port of said printing means, said cap means having a pipe member for exhausting the ink therein;

shutter means for withdrawing from an opening of said cap means when said cap means closes the discharge port of said printing means and for closing the opening of said cap means when said cap means does not close the discharge port of said printing means; and carriage means mounted for movement along the recording medium and having waste ink storage means mounted thereon, wherein said pipe member and said waste ink storage means are coupled to each other upon movement of said carriage means to a specific position.

17. A capping device comprising:

cap means for covering a discharge port of printing means, the discharge port being arranged for discharging ink for printing on a recording medium and said cap means being movable into and out of sealing engagement with the printing means;

cap moving means for moving said cap means into and out of sealing engagement with the printing means;

absorbing means, arranged wholly inside said cap means and movable into and out of direct contact with the discharge port while said cap means covers the discharge port in sealing engagement with the printing means, for absorbing the ink in the immediate vicinity of the discharge port;

means for moving said absorbing means between a position at which said absorbing means is in direct contact with the discharge port and a position at which said absorbing means is separated from the discharge port while said cap means is in sealing engagement with the printing means; and removing means for removing the ink absorbed by said absorbing means.

18. A capping device according to claim 17, wherein, said absorbing means comprises a porous elastic body.

19. A capping device comprising:

cap means for covering a discharge port of printing means, the discharge port being arranged for discharging ink for printing on a recording medium;

absorbing means, arranged wholly inside said cap means and movable into and out of direct contact with the discharge port when said cap means covers the discharge port, for absorbing the ink in the immediate vicinity of the discharge port; and removing means for removing the ink absorbed by said absorbing means, wherein said removing means removes the ink by compressing said absorbing means.

20. A capping device comprising:

cap means for covering a discharge port of printing means, the discharge port being arranged for discharging ink for printing on a recording medium;

absorbing means, arranged wholly inside said cap means and movable into and out of direct contact with the discharge port when said cap means covers the discharge port, for absorbing the ink in the immediate vicinity of the discharge port; and removing means for removing the ink absorbed by said absorbing means, wherein said removing means includes a common power source for generating power for moving said absorbing means away from the discharge port and for exhausting the ink from said absorbing means.

21. A capping device comprising:

cap means for covering a discharge port of printing means, the discharge port being arranged for discharging ink for printing on a recording medium and said cap means being movable into and out of sealing engagement with the printing means;

cap moving means for moving said cap means into and out of sealing engagement with the printing means;

absorbing means, arranged wholly inside said cap means, for absorbing the ink in the immediate vicinity of the discharge port; and means for moving said absorbing means between a position at which said absorbing means is in direct contact with the discharge port and a position at which said absorbing means is separated from the discharge port while said cap means is in sealing engagement with the printing means.

22. A capping device according to claim 21, further comprising removing means for removing the ink absorbed by said absorbing means.

23. A capping device comprising:

cap means for covering a discharge port of printing means, the discharge port being arranged for discharging ink for printing on a recording medium;

absorbing means, arranged wholly inside said cap means, for absorbing the ink in the immediate vicinity of the discharge port;

moving means for moving said absorbing means between a position at which said absorbing means is in direct contact with the discharge port and a position at which said absorbing means is separated from the discharge port when said cap means covers the discharge port;

removing means for removing the ink absorbed by said absorbing means, wherein said moving means and said removing means are driven by a common drive source; and a drive mechanism for energizing said removing means when said moving means moves said cap means away from the printing means.

24. A capping device comprising:

cap means for covering a discharge port of printing means, the discharge port being arranged for discharging ink for printing on a recording medium;

absorbing means, arranged wholly inside said cap means, for absorbing the ink in the immediate vicinity of the discharge port; and moving means for moving said absorbing means between a position at which said absorbing means is in direct contact with the discharge port and a position at which said absorbing means is separated from the discharge port when said cap means covers the discharge port, wherein said cap means has an opening for exhausting the ink absorbed by said absorbing means to the outside and a valve member for closing said opening when said cap mean is separated from the printing means.

* * * * *

UNITED STATES PATENT AND TRADEMARK OFFICE

CERTIFICATE OF CORRECTION

PATENT NO. : 4,819,012

DATED : April 4, 1989

INVENTOR(S) : TAKEHIKO KIYOHARA, ET AL.

It is certified that error appears in the above-identified patent and that said Letters Patent is hereby corrected as shown below:

COLUMN 1

Line 11, "printing very" should read --printing is very--.
Line 12, "printer" should read --printer,--.
Line 13, "system" should be deleted and "recording" should read --recording system--.
Line 49, "Alternatively" should read --Alternatively,--.

COLUMN 2

Line 63, "FIRST" should be deleted.
Line 64, "EMBODIMENT" should read --FIRST EMBODIMENT--.

COLUMN 4

Line 16, "which cov-" should read --which it cov- --.

COLUMN 5

Line 61, "not contact" should read --not in contact--.

COLUMN 7

Line 1, "inkjet nozzles 1a" should read --ink-jet nozzles 1a--.

UNITED STATES PATENT AND TRADEMARK OFFICE

CERTIFICATE OF CORRECTION

PATENT NO. : 4,819,012

DATED : April 4, 1989

INVENTOR(S) : TAKEHIKO KIYOHARA, ET AL.

It is certified that error appears in the above-identified patent and that said Letters Patent is hereby corrected as shown below:

COLUMN 11

Line 46, "absorber, 67" should read --absorber 67--.
Line 61, "direction" should read --direction.--.

COLUMN 12

Line 9, "also," should read --also--.

COLUMN 13

Line 5, "nozzles in" should read --nozzles by--.
Line 45, "said absorbing" should read --said absorbing means--.

COLUMN 14

Line 45, "portion" should read --position--.

COLUMN 16

Line 33, "wherein," should read --wherein--.

UNITED STATES PATENT AND TRADEMARK OFFICE
CERTIFICATE OF CORRECTION

PATENT NO. : 4,819,012

DATED : April 4, 1989

INVENTOR(S) : TAKEHIKO KIYOHARA, ET AL.

It is certified that error appears in the above-identified patent and that said Letters Patent is hereby corrected as shown below:

COLUMN 18

Line 26, "cap mean" should read --cap means--.

Signed and Sealed this

Sixteenth Day of January, 1990

*Attest:*

JEFFREY M. SAMUELS

*Attesting Officer*

*Acting Commissioner of Patents and Trademarks*